Sept. 4, 1951 F. M. CARROLL ET AL 2,566,927

RECORD FEEDING DEVICE

Original Filed Nov. 28, 1942 5 Sheets-Sheet 1

INVENTORS
F. M. CARROLL
A. F. SMITH
BY
ATTORNEY

Sept. 4, 1951 F. M. CARROLL ET AL 2,566,927

RECORD FEEDING DEVICE

Original Filed Nov. 28, 1942 5 Sheets-Sheet 2

INVENTORS
F. M. CARROLL
A. F. SMITH
BY
ATTORNEY

Sept. 4, 1951 F. M. CARROLL ET AL 2,566,927

RECORD FEEDING DEVICE

Original Filed Nov. 28, 1942 5 Sheets-Sheet 3

INVENTORS
F.M. CARROLL
A.F. SMITH
BY
ATTORNEY

INVENTORS
F. M. CARROLL
A. F. SMITH
BY W. M. Wilson
ATTORNEY

RECORD FEEDING DEVICE

Inventors
Fred M. Carroll
Arthur F. Smith
By John W. Armbruster
Attorney

Patented Sept. 4, 1951

2,566,927

UNITED STATES PATENT OFFICE 2,566,927

RECORD FEEDING DEVICE

Fred M. Carroll, Binghamton, and Arthur F. Smith, Endicott, N. Y., assignors to International Business Machines Corporation, New York, N. Y., a corporation of New York Original application November 28, 1942, Serial No. 467,244. Divided and this application December 29, 1945, Serial No. 638,343

2 Claims. (Cl. 271—10)

This application is a division of our copending application Serial No. 467,244, filed November 28, 1942 which matured into Patent No. 2,493,858, January 10, 1950.

The invention relates to record feeding devices and more specifically to improvements in card feeding means in record controlled tabulating machines.

An object of the invention is to provide a card sensing device wherein the record is advanced at different rates of speed. The card motion is comparatively slow and uniform while data representing indicia thereon are being sensed and then, after sensing is completed, the card motion is made more rapid.

As part of the improved sensing device there is provided an accelerated feed mechanism to speed up the advance of the card between sensing stations which are spaced apart far enough to provide room for interspersed feeding rollers. The machine is operated on a 20 point cycle but the room required for the interspersed rollers causes the analyzing stations to be spaced apart further than a distance commensurate with 20 point operation. Therefore, the difference in distance is made up by accelerating the movement of the card between stations.

Other objects of the invention will be pointed out in the following description and claims and illustrated in the accompanying drawings, which disclose, by way of example, the principle of the invention and the best mode, which has been contemplated, of applying that principle.

*The driving mechanism*

Figure 1:
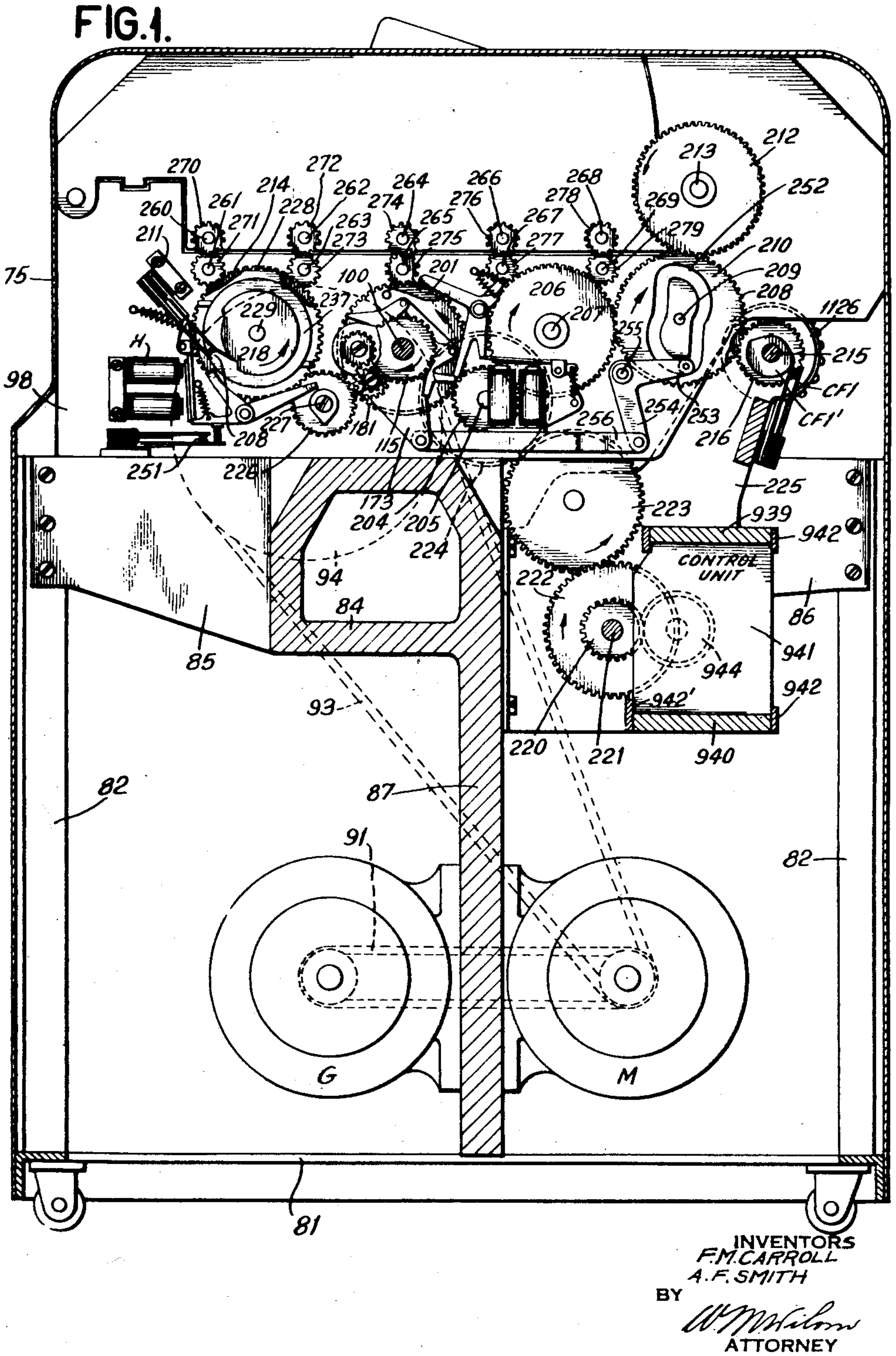
Fig. 1 is a sectional elevation view showing the clutch devices and drive gearing cooperating with the card feeding rollers.

In Fig. 1 it is seen that a motor M is attached to the rear side of a vertical frame web 87. The motor shaft extends and carries a pulley around which is wrapped a belt 93 passing upwardly around a large driving pulley 94 connected to a spur gear 95 (Fig. 2) pivoted on a center 96 extending from one of the card feed unit frames 97. The driving motion is communicated through gear 95 to a large gear 99 (Fig. 3) attached to a main drive shaft 100 passing through the card feed unit.

At this point it is well to mention that the driving mechanism is not all operated with a uniform motion. Although the driving action of shaft 100 is communicated directly to the printing, accumulating, total taking, and other devices of the machine for operation in a uniform manner, other gearing devices associated with the card feed are driven through a gear 115 (Figs. 1, 5 and 6) which is attached to shaft 100 and cooperating with a planetary gear train for accelerating the drive connections associated with the card feed for reasons explained more fully hereinafter. Shaft 100 rotates at the rate of only one revolution for two cycles of operation, but the shafts geared thereto are driven with a 1 to 1 ratio.

Figure 2:
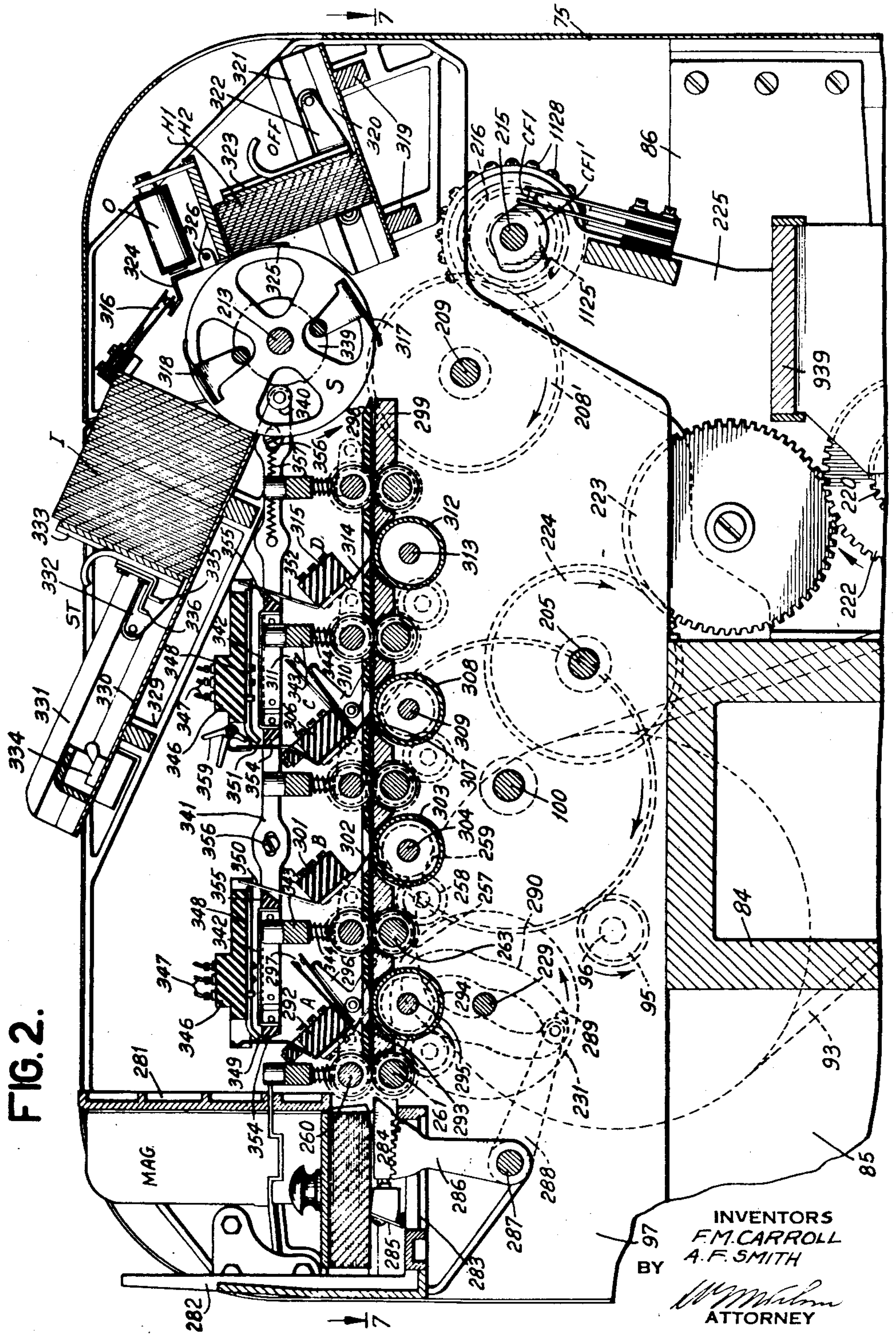
Fig. 2 is a sectional elevation showing the card feeding and sensing devices.
Figure 3:
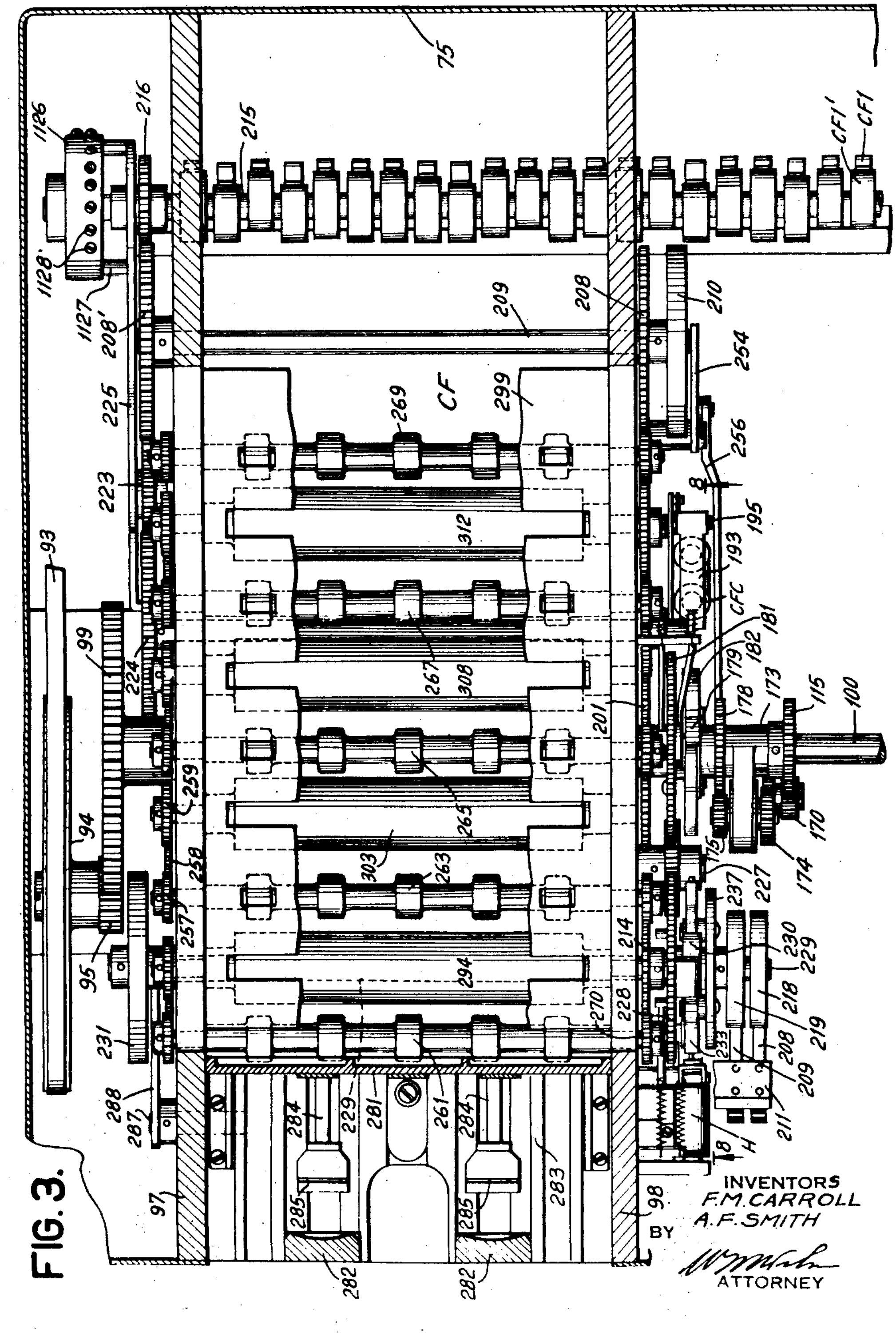
Fig. 3 is a plan view showing the card feeding rollers and drive gearing.

The path followed by the cards in passing through the sensing devices may be observed in Fig. 2. There it is seen that the cards are assembled in a magazine MAG at the left with the heading cards interspersed between related item cards I. The cards are picked off one by one from the bottom of the stack in the magazine and sent across the machine toward the right (i. e. toward the back of the machine when observed from the front) and through a series of four sensing stations lettered A, B, C and D. Each card passes a pair of sensing stations in a single cycle of operation. The brushes at the sensing station A comprise an upper zoning control while the next set of brushes B are devoted to control for printing. The next set of sensing brushes C form another or secondary zoning control, and the sensing devices at D comprise a second printing control station. After leaving the last sensing station D, the cards continue to move toward the right and are picked up successively by a stacker drum S which deposits them in one of two places. The first stacking station OFF is identified as an offset stacking station for receiving only the heading cards which are thus segregated from the item cards which are carried further by the stacking drum S and deposited in the stack ST containing all item cards I. The card handling devices are described more fully hereinafter, reference here being merely for the purpose of describing the path of motion taken by a card when passing through the sensing stations.

The cards are ordinarily picked out of the magazine in evenly timed succession and at intervals adapted to place one card in cooperation with brushes at stations A—B while the advanced card is in a similar state of cooperation with the brushes at stations C—D. An exception is involved in the handling of heading cards in that successive feeding is interrupted to take two print control readings from a single card.

The cards each contain eighty vertical rows of index positions, each row having twelve index points, ten of which are allotted to digit representations in the form of perforations and two other upper positions 12 and 11 for zone control or special X and R control perforations. This is the usual Hollerith arrangement of index points on a perforated record. As is usual in machines of this kind, the vertical distance between index points is taken as a measure of machine cycle operation. Many machines have a sixteen point cycle, that is, they feed a card uniformly through the twelve vertical index positions under a sensing device and then have four additional and similar time intervals devoted to control operations.

In the present machine, a cycle of twenty points was found necessary to allow sufficient time for operations other than sensing operations. In one operating cycle of the present machine more than half of the operating time is consumed by the passage of the twelve vertically arranged index points on a record card under the sensing devices, and then eight other intervals of time similar to that consumed by the passage of a card from one index point to another are provided for control operations. The feeding motion is accelerated during the last third of each cycle.

In explaining the need for a card feed drive that is not uniform in motion, reference may be made to Fig. 2, wherein by comparison with the twelve points of width of the card it is seen that the card sensing stations A and C cannot be spaced close enough to be within twenty index point positions with respect to one another. In other words, a uniform motion of the cards across the machine under the sensing devices would not conform with the twenty point cycle found desirable for operation of the remainder of the machine. An amount of time greater than twenty intervals would be required to feed a card from station A to station C. Therefore, the card feeding devices are provided with planetary gearing for speeding up the motion of the card and all other cooperating devices during card feeding time other than the perforation sensing time.

The use of planetary gearing is not a provision for getting a net gain of time for each cycle, but rather for a better distribution of the time available; i. e., for getting a comparatively slow card movement while a precise analysis of the index points of the card is taking place, and then, in the last, less critical operation of the cycle, speeding up the card movement.

Figure 7:
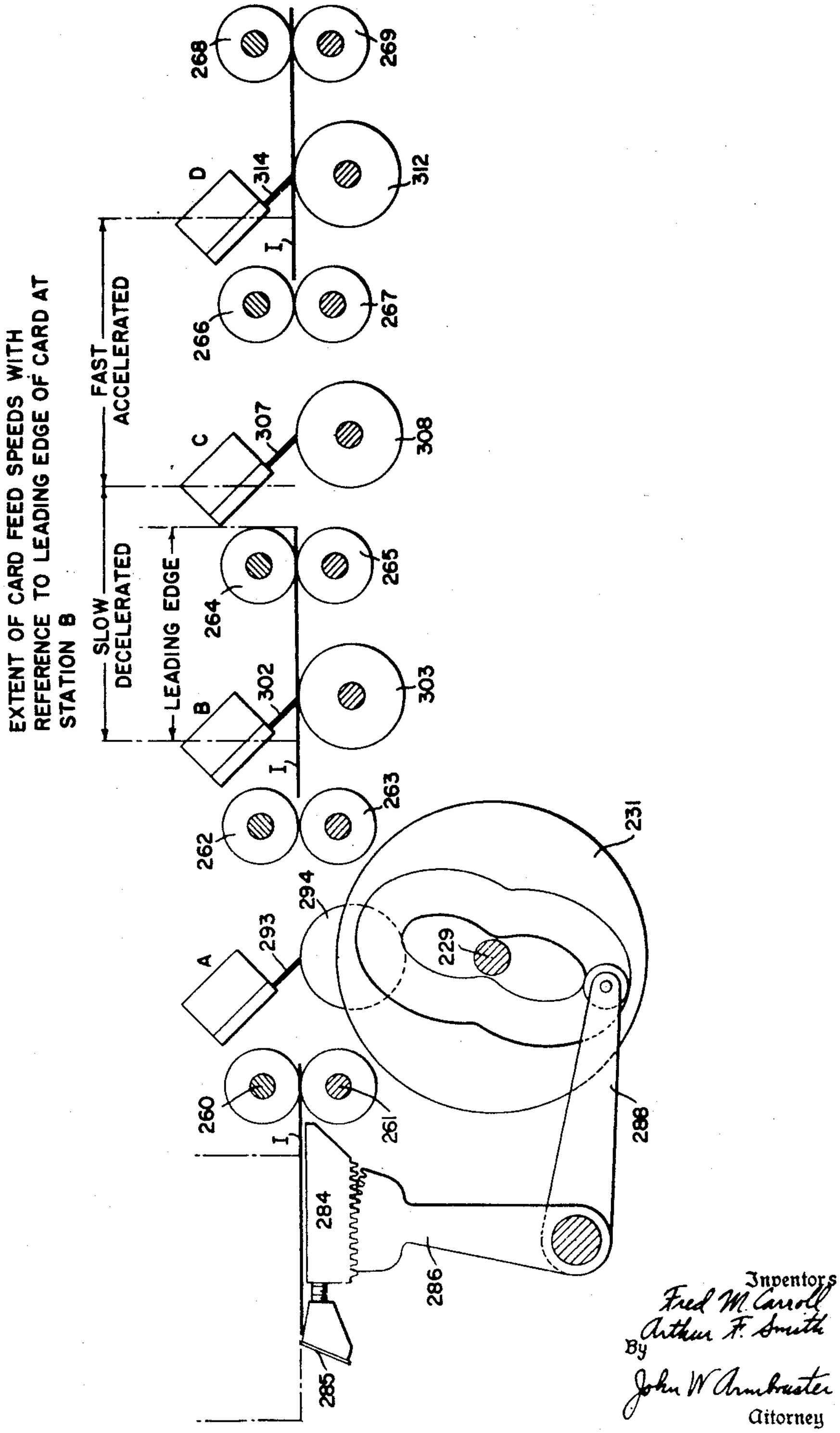
Fig. 7 is a diagrammatic view of the record card feeding and sensing devices with a plurality of cards en route.

Notations regarding points of change of speed are noted on Fig. 7 and there given with reference to the leading edge of the card under the brush at station B. The extent of feed with deceleration or slow travel, and the extent of acceleration or fast travel, are both shown. While the 11 and 12 index points of the card are passing under the brush at A, the movement is comparatively slow. Directly thereafter the 9 to 0 index points are sensed by the brush at B and that is also done slowly. However, after the 0 point is sensed at B, then the object is to move the card quickly to the right to bring the 11 index point over under the brush at station C. The extent of that last, fast and accelerated part of each cycle of card motion is shown on Fig. 7.

A card is moved with a uniform but accelerated motion under a pair of sets of sensing brushes, while the perforations are controlling printing. Then, immediately after this phase of the operation is ended, the same decelerating set of planetary gears cooperates with the driving mechanism to accelerate the card movement and pass through the space leading to the next pair of sets of brushes which is greater than the space equivalent to eight cycle index point intervals remaining in the operating cycle. The accelerating devices for the card feed mechanism will now be described.

*Card feed driving mechanism*

As already pointed out, the gear 115 is fastened to the main driving shaft 100 which is constantly operated in a clockwise direction (Fig. 1) one-half revolution for each cycle as long as the motor M is energized. This gear 115 is the driving source of the card feeding, card stacking and cam contact operating devices.

Figures 5, 6:
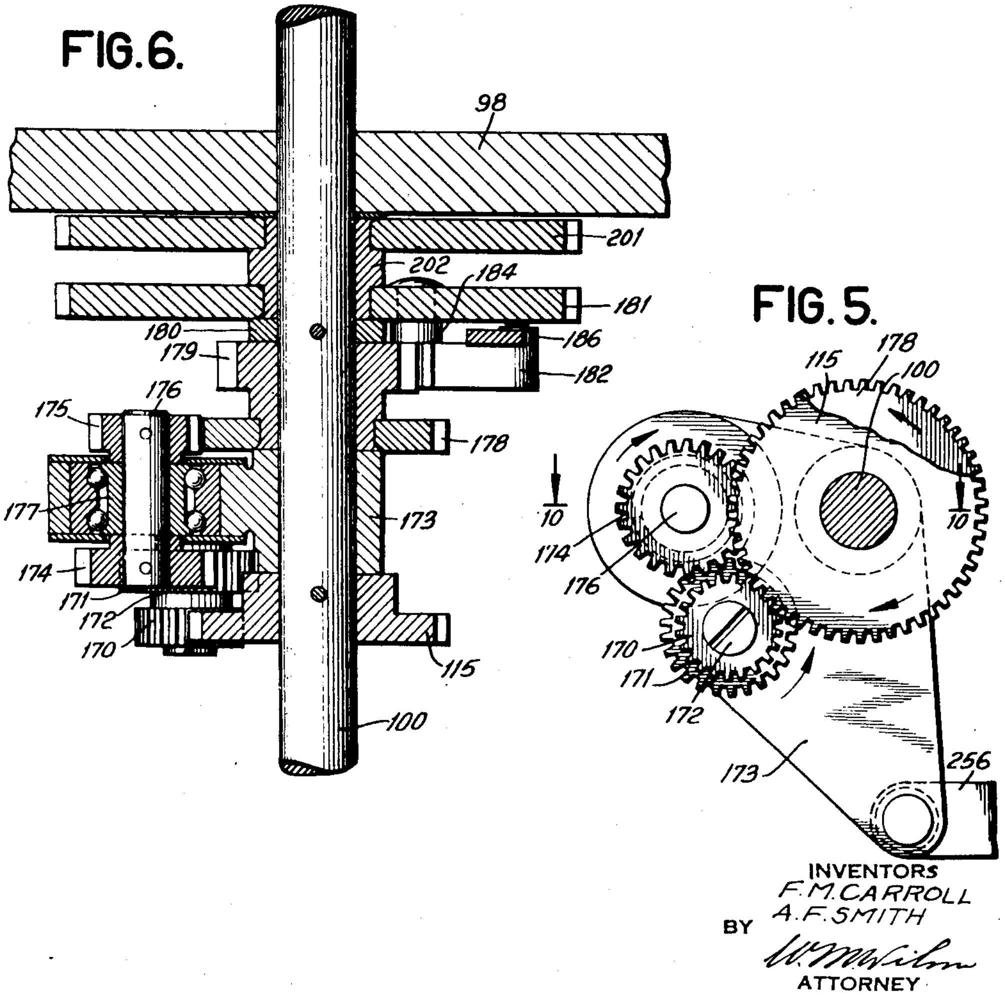
Fig. 5 is a detail view in side elevation showing the planetary gearing provided for accelerating certain sets of card feeding rollers.
Fig. 6 is a sectional plan view showing the feed accelerating gearing.

In Figs. 5 and 6, it is seen that this gear 115 meshes with the smaller gear 170 of a pair of joined gears 170, 171 loosely pivoted on a stud 172 projecting from the side of an accelerating lever 173 loosely pivoted on shaft 100. Also carried by lever 173 is a pair of planetary pinions 174, 175 which are connected by being pinned on the same stub shaft 176 running through a ball bearing 177 centered in the end of an arm extending from lever 173. The planetary pinion 174 meshes with the gear 171 driven by gear 115 through pinion 170. The driving motion of gear 115 is carried directly through the chain of gearing 170, 171, 174 and 175 to another gear 178 attached to a notched clutch disk 179 loosely mounted on shaft 100. The direction of operation is not maintained because, as drive gear 115 (Fig. 5) is operated in a clockwise direction, clutch disk 179 (Fig. 4) is turned in a counterclockwise direction.

Figure 4:
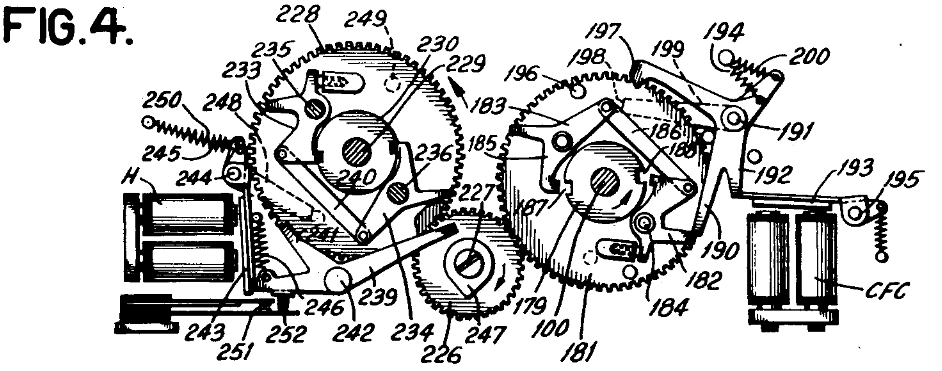
Fig. 4 is a detail view showing the clutching devices cooperating with card feeding mechanism.

Adjacent clutch disk 179 (Fig. 6) and separated therefrom by a collar 180 is a large gear 181 carrying a pair of clutch dogs 182, 183 (Fig. 4). These clutch dogs are pivoted at 184 and 185, respectively, and are joined by a link 186. Each is formed with a hook-shaped projection adapted to engage either of the notches 187, 188 formed in disk 179. They are normally prevented from doing so by an armature lever 190 which abuts against an extending arm projecting from either clutch dog. The armature lever 190 is pivoted at 191 on the feed unit frame 98 and formed with an extension 192 cooperating with an armature 193 assembled above the card feed control magnet CFC. A spring 194 attached to armature lever 190 tends at all times to rock it in a counterclockwise direction and so operates when the magnet CFC is energized. Then, the clutch dogs are allowed to engage the disk 179 and turn gear 181 in a counterclockwise direction (Fig. 4) as driven through the planetary gearing. Armature lever 190 is restored by one of two pins 196 projecting from side of gear 181 and cooperating with an extension 197 formed on the lever and placed in the path of the pins when the clutch connection is made.

Another pair of pins 198 projects from the side of gear 181 opposite to the side bearing pins 196, and they cooperate with a rebound preventing latch 199 also pivoted on center 191 and tensioned by spring 200 to snap into place as the clutch gear reaches the normal position.

The driving operation of gear 181 (Fig. 6) is communicated to a similar gear 201 connected thereto by a hub 202 loosely mounted on shaft 100. A chain of gearing reaching toward the rear of the machine is driven through operation of gear 201, while another assemblage of gearing near the front of the machine is driven by gear 181.

In Fig. 1, it is seen that gear 201 meshes with an idler gear 204 on a shaft 205. Cooperating with gear 204 is a larger gear 206 pivoted on a stud 207 extending from the side frame 98. The drive continues from gear 206 to a meshing gear 208 fastened on a shaft 209 carrying a box cam 210 for controlling operation of the planetary gears cooperating with the card feed drive. Gear 208 meshes with another gear 212 fastened to shaft 213 carrying the stacker drum S shown in Fig. 2.

On the left side of the card feed unit (Fig. 3) the drive continues from shaft 209 to a shaft 215 carrying cams for operating card feed control contacts. On shaft 215 is fastened a gear 216 cooperating with a gear 208′ fastened to the end of shaft 209 which is driven through gear 208 as already mentioned.

A horizontal train of gearing is driven to operate the picker device and the feed rollers for handling the cards as they first appear upon leaving the magazine. Cooperating with one of the main card feed gears 181 (Fig. 1) is a small gear 226 loosely mounted on a stud 227 extending from the side frame 98. Also meshing with gear 226 is a gear 228 loosely mounted on a shaft 229 and carrying a clutch disk 230 (Fig. 4). Shaft 229 (Fig. 3) extends across the card feed unit, and to its left end is fastened a box cam 231 for controlling movement of a picker for pushing the cards out of the magazine in succession. Although gear 228 and clutch disk 230 (Fig. 4) are rotated continuously as long as the motor is operating; shaft 229, the connected gearing and the box cam for operating the card moving devices to issue a card out of the magazine, are operated selectively under control of a magnet H which is effective to release a pair of clutch dogs 233 and 234 pivoted at 235 and 236 upon a disk 237 (Fig. 3) attached to shaft 229. The clutch dogs 233 and 234 are shown engaged with disk 230 (Fig. 4) as they are normally when card feeding is operated successively. However, there are times when a heading card is to be held up before the sensing devices while a preceding card is advanced. Then the heading card is sensed twice for successive printing from the same card.

The operation of the clutch devices connected with shaft 229 may be followed further with reference to Fig. 4 by noting that the dogs 233, 234 are connected by a link 240 and both are formed with extensions cooperating with a release lever 241 pivoted at 242. Clutch release lever 241 has a horizontal arm normally abutting against the lower end of armature 243 pivoted at 244 and operated by the hopper control magnet H. A spring 245 tends to rock the armature 243 away from magnet H to hold lever 241 cocked in a counterclockwise direction to release the clutch dogs. However, when the magnet is energized, the armature is rocked in a clockwise direction, releasing lever 241 for operation under control of a spring 246 tending to turn it in a clockwise direction and move a vertical arm thereon in the path of the extensions on the dogs, so that they are rocked about pivots 235 and 236 and disengaged from the notched disk 230.

After a cycle of operation wherein the clutch is disengaged, a cam 247 attached to idler gear 226 goes into play to operate a long arm 239 on clutch release lever 241, so that the lever is rocked back in a counterclockwise direction to release the clutch dogs for normal engagement with the card magazine drive.

A rebound locking arm 248 is pivoted on the armature center 244 and disposed in the path of a pair of pins 249 extending from the side of gear 228. Spring 250 maintains the latch 248 in operating position so that, after the pin passes the front end of lever 248, it is prevented from turning backwards in a clockwise direction and the card feeding devices connected with shaft 229 are held in a normal position. The picker and other feeding parts in Figs. 1 and 2 are shown in a partly operated position.

Before going further into the explanation of the manner of issuing the cards out of the magazine and across the sensing devices, it is believed well to point out how the drive gearing already mentioned is accelerated for a portion of the cycle of operation. Referring to Fig. 1, it is observed that the box cam 210 is driven in a clockwise direction and is formed with a cam groove 252 into which there protrudes a roller 253 on one arm of a bell crank 254 pivoted at 255. The lower end of this bell crank 254 is pivotally attached to a link 256, the other end of which is articulated on the planetary gear carrying arm 173 (Fig. 5). These connections serve to move the gearing 170, 171, 174, 175 with respect to gears 115 and 178, so that instead of direct 1:1 ratio of operation between the driver 115 to the driven gear 178, there is additional movement imparted when the gear carrier 173 moves in a counterclockwise direction (Fig. 5) with respect to the driving gear 115.

The cam groove 252 (Fig. 1) is seen to have a pair of sharply curved lobes, each of which serves to oscillate the bell crank 254 up and down for each cycle as the box cam 210 rotates in a clockwise direction. In the first part of the motion of the cam, the bell crank is rocked in a counterclockwise direction and the planetary gear carrier 173 is also moved in a counterclockwise direction to advance the gearing and accelerate the movement at a time when the card is being brought to the sensing station. Then the connected planetary gears are shifted around the moving driving gear 115 and serve to speed up the operation of the gear 178 connected to the clutch disk. Through the clutch this accelerated motion is imparted to all the chains of gearing mentioned hereinbefore. In other words, the various gear trains deriving their motion from gears 181 and 201 (Fig. 6) are operated through a portion of the cycle in an accelerated manner, and then later have a retarded movement as the planetary gears are restored. Deceleration is uniform and the drive gears are proportioned to compensate for it.

After one-half cycle (one quarter revolution of cam 210, Fig. 1), the other lobe of the cam cooperates with the bell crank 254 and it pushes arm 173 in a clockwise direction. The planetary gears in moving clockwise (Fig. 5) have a decelerating effect on clutch gear 178 at a time when cards are being analyzed at stations B and D, but the retarding movement is uniform and compensated.

Gears 201 and 206 (Fig. 1) cooperate with six pairs of pinions for rotating the card feeding rollers cooperating directly with the card. Gear 201 operates in a counterclockwise direction and turns a pinion 275 in a clockwise direction to move the card toward the right. Meshing with pinion 275 is a similar pinion 274 on the opposite side of the card path. This cooperating pair of pinions is mounted on shafts 264 and 265 passing through the card feed side frames.

Two other pairs of card feed rollers are operated by the gear 206. One pair of gears 276, 277 are fastened on shafts 266 and 267, and the lower gear 277 meshes with the driver 206. In a similar fashion, shafts 268 and 269 carry the last set of feed rollers and pinions 278 and 279 and are driven by a gear 206.

The gear 228 loosely mounted on shaft 229 near the magazine cooperates with two pairs of feed rollers to carry the cards along as they leave the magazine. The first pair of shafts 260, 261 carry pinions 270, 271, the latter meshing with the drive gear 228. In a similar fashion, shafts 262, 263 are rotated by pinions 272, 273 thereon cooperating with the drive gear 228.

The cards are issued out of the magazine MAG (Fig. 2) by means of picker devices operated selectively under control of the clutch devices (Fig. 4) and magnet H. The magazine is built up with a wall 281 (Fig. 3) fastened between the card feed unit side frames 97 and 98. Opposite to wall 281 is a pair of vertical card guides 282 fastened to a base plate 283 which is slotted to carry a pair of picker slides 284. These slides 284 are mounted directly beneath the table upon which the cards rest in the magazines, and each carries a blade 285 which extends above the card supporting surface far enough to engage the edge of the bottom card when the picker slide is moved to the extreme left position as viewed in Fig. 2.

The bottoms of the picker slides 284 are provided with rack teeth with which there meshes a pair of sectors 286 fastened to a shaft 287 carried in the feed unit side frames. Also attached to shaft 287 and extending outside the left side frame 97 (Fig. 3) is an operating arm 288 carrying a roller 289 (Fig. 2) fitted within the cam groove 290 cut into the box cam 231. As already explained, cam 231 is attached to the shaft 229 which rotates at all times except when magnet H is energized to disengage the clutch cooperating with shaft 229. The cam groove 290 is proportioned with a double lobe because the connections are operated through a half revolution for each cycle of operation of the machine.

When the cam is operated, the operating arm 288 is lifted rapidly and the picker slide 284 is moved toward the left, Fig. 6, to catch the forward edge of the bottom card. Directly thereafter, the cam groove reverses the motion of the picker oscillating parts and, with a diminishing speed of operation, the slide 284 is moved toward the right to carry the bottom card into the first set of card feeding rollers carried by the shafts 260 and 261.

After the card is engaged by the first set of rollers, it is carried across the machine from left to right (Fig. 2) from one set of rollers to the other and cooperating successively with the four sensing stations A, B, C and D. At the first sensing station A, an insulation bar 292 carries a set of downwardly projecting sensing brushes 293 cooperating with a contact roller 294 fastened to a shaft 295. While the card is in cooperation with brushes 293, it rocks a card lever 296 cooperating with a pair of card lever contacts 297 which are closed as long as a card is at the sensing station A. The card is confined to a straight line direction of motion between the various sets of rollers by a pair of slotted plates 298 and 299 extending along the card path on both sides of the line of contact between the upper and lower feed rollers.

After the card passes under the first set of brushes 293, it is carried along by the rollers 262, 263 to the sensing station B, wherein a block 301 carries a set of brushes 302 cooperating with a contact roller 303 fastened to shaft 304. The card is shifted further to the left by rollers 264, 265 to station C wherein a carrying block 306 forms a mounting for a set of brushes 307 cooperating with a contact roller 308 on a shaft 309. At this station, another card lever 310 is pivoted in the path of the card and, when operated by the card, closes a second pair of card lever contacts 311.

The final sensing station D is reached when the card is advanced by the feed rollers 266, 267, and there the card passes over a contact roller 312 mounted on a shaft 313. Cooperating with contact roller 312 is a set of brushes 314 fastened to an insulation block 315. After passing the last brush station D, the card is carried into the stacker S by means of the feed rollers 268, 269. As the card projects beyond plates 298, 299, it is engaged by one of a pair of grippers 317, 318 pivotally mounted on the stacker drum S. This drum is rotated with shaft 212 in a counterclockwise direction to deposit a card in one of the two card receivers or stackers OFF and ST.

The first stacker is the one for receiving the heading cards, and it is supported on a frame comprising two rectangular bars 319 fastened across the feed unit side frames. Secured above the frame 319 is a base plate 320 formed with a horizontal slot 321, which carries a carriage 322 with a cross plate 323 pressing the deposited cards against the stacker drum S. The cards normally pass this first offset stacking station OFF because the majority of the cards are item cards which are supposed to go to the second stacker ST. However, when a magnet 0 is operated, its armature 324 places an elongated deflector 325 in the path of the card as it is carried by one of the grippers 317, 318. When magnet 0 is operated, it is a sign that the card is a heading card and is supposed to be deposited in the first stacking group. Then, the armature 324 is rocked in a clockwise direction about pivot 326, and the deflector 325 protrudes within the outer periphery of drum S and engages the forward edge of the heading card and presses it back against the group of cards in front of plate 323 as the stacker clip passes and continues to rotate in a counterclockwise direction.

The stacker ST for the item cards I is held on a frame 329 fastened at an angle between the feed unit side frames. On frame 329 is a base plate 330 and a pair of grooved side walls 331 between which the cards are assembled. Along the grooved side walls there rides a carriage 332 to which is attached a pressure plate 333 for holding the cards upright. A switch 334 is mounted on the base plate 330 near the upper end and in alignment with a rearward projection 335 on the pressure plate 333. As the stacker ST becomes filled, plate 333 and projection 335 move to the left (Fig. 2) against switch 334 to operate it and stop the machine. A second, shorter extension 336 is placed on plate 333 to throw the knob of switch 334 to the "on" position when the plate is moved to the right after the stacked cards I are removed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record controlled tabulating machine for analyzing data indicia on records, a pair of record sensing means spaced along the path of the records to analyze said indicia of a record successively, a magazine for holding said records, a main operating mechanism, a picker device for issuing said records out of said magazine one by one and into said path in succession, clutching means for connecting said picker device to the main operating mechanism, a record feeding means for carrying an issued record along said path and through said sensing stations in succession, said feeding means including planetary gearing and a holder for said gearing, a clutch for said feeding means, said gearing and said clutch being interposed between the main operating mechanism and said feeding means, and a cam for oscillating said holder to produce alternating fast accelerated and slow decelerated advance motions of a record, the first half oscillation for slow deceleration coinciding with the record analyzing part of the cycle while the record is sensed at the first sensing means, and the second half oscillation for fast acceleration coinciding with the non-sensing part of the cycle while the record is advancing to the second sensing means, whereby said feeding means is controlled to accelerate the movement of a record between record analyses and then decelerate the movement of the record during record analysis.

2. A machine according to claim 1 in which said cam has two actuating lobes and one side of each lobe is proportioned so that deceleration is performed uniformly, whereby deceleration may coincide with the record sensing part of each record feeding cycle.

FRED M. CARROLL.
ARTHUR F. SMITH.

REFERENCES CITED

The following references are of record in the file of this patent:

UNITED STATES PATENTS

| Number | Name | Date |
|---|---|---|
| 1,537,594 | Elsworth et al. | May 12, 1925 |
| 1,597,941 | White | Aug. 31, 1926 |
| 1,933,331 | Lake | Oct. 31, 1933 |
| 2,153,180 | Fuller et al. | Apr. 4, 1939 |
| 2,181,211 | Sieg | Nov. 28, 1939 |